United States Patent [19]

Mackowski

[11] Patent Number: 4,746,538

[45] Date of Patent: May 24, 1988

[54] PROCESS FOR DEPOSITING A THIN LAYER OF A MATERIAL ON THE WALL OF A HOLLOW BODY

[75] Inventor: Jean M. Mackowski, Villeurbanne, France

[73] Assignee: Centre National de la Recherche Scientifique (CNRS), Paris, France

[21] Appl. No.: 2,265

[22] Filed: Jan. 12, 1987

[30] Foreign Application Priority Data

Jan. 14, 1986 [FR] France .................. 86 00586

[51] Int. Cl.$^4$ ............................................. B05D 3/06
[52] U.S. Cl. ................................... 427/38; 427/237; 427/238; 427/294
[58] Field of Search .................. 427/37, 38, 237, 238, 427/294

[56] References Cited

U.S. PATENT DOCUMENTS 4,262,035 4/1981 Jaeger et al. .................. 427/237 X
4,374,157 2/1983 Barbier et al. .................. 427/37 X

FOREIGN PATENT DOCUMENTS 2248882 5/1975 France .
2355925 1/1978 France .
2446327 8/1980 France .

OTHER PUBLICATIONS

Journal of Applied Physics, vol. 54, No. 8, Aug. 1983, pp. 4590–4595.
Chemical Abstracts, vol. 96, No. 8, Feb. 1982, p. 293.
Chemical Abstracts, vol. 102, No. 6, Feb. 1985, p. 263.

Primary Examiner—Bernard D. Pianalto
Attorney, Agent, or Firm—Parkhurst & Oliff

[57] ABSTRACT

The present invention relates to the deposition of a thin layer of a material on the wall of a hollow body. According to the invention, a cathode (9) of variable geometry, the metal wires (13) being capable of extending and retracting, is arranged inside the hollow body (1b), a plasma of a complex of the material to be deposited being produced and placed in contact with the polarized wall of the hollow body (1). The invention applies in particular to the deposition of a thin layer of diamond-like amorphous carbon on the outside of a narrow-necked glass bottle, in order to increase its impact strength.

26 Claims, 3 Drawing Sheets

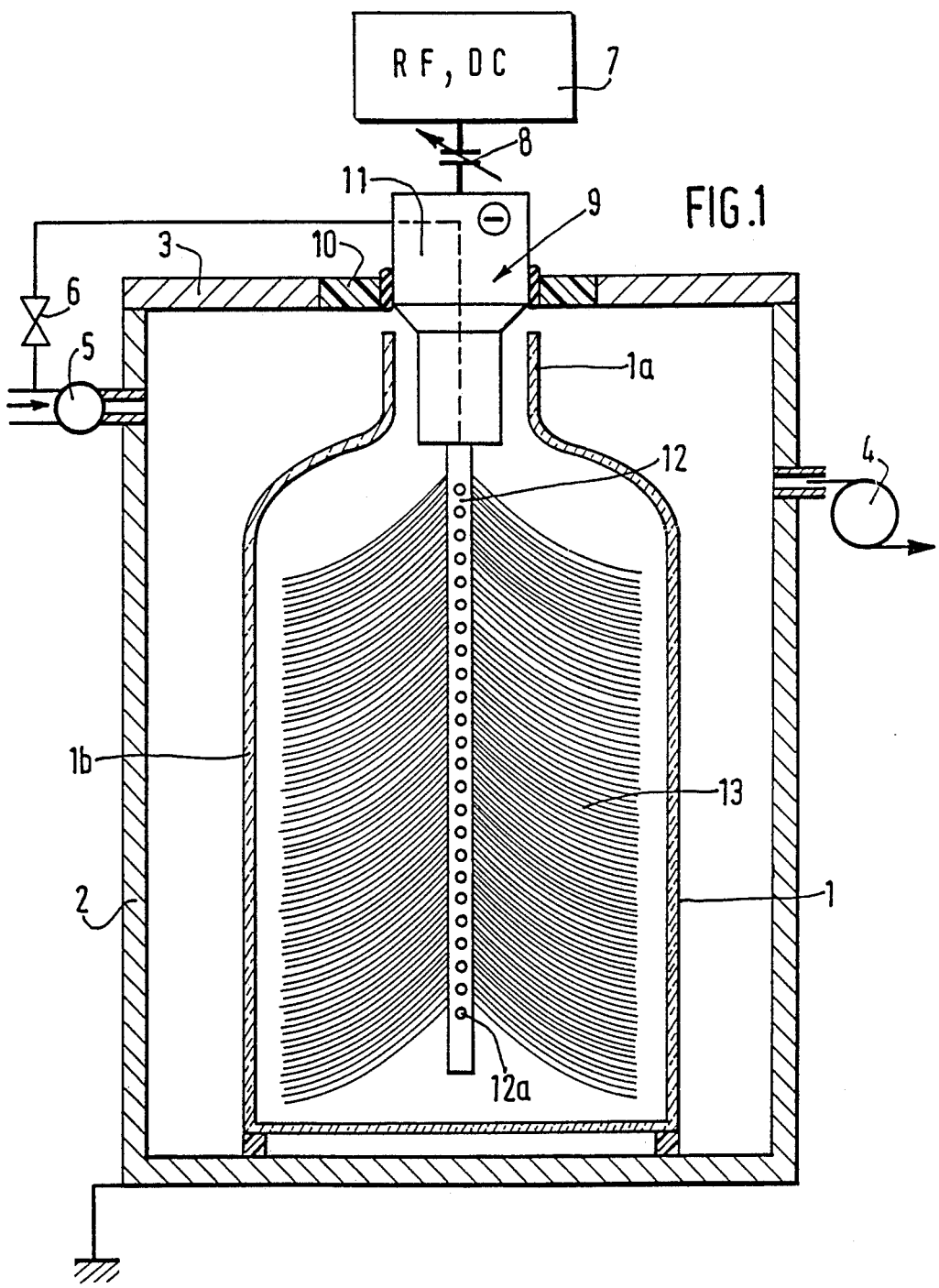

PROCESS FOR DEPOSITING A THIN LAYER OF A MATERIAL ON THE WALL OF A HOLLOW BODY

The invention relates to the deposition of a thin layer of a material, for example of diamond-like amorphous carbon on the outside and/or on the inside of the wall of a hollow body made, for example, of glass or vitreous substance.

"Material" is intended to mean any substance, organic or inorganic, simple or complex, capable of being produced in gaseous phase, in combination or otherwise with another component which, after decomposition in the form of plasma, will be selectively removed from the enclosure for the application of the plasma.

Thus, if carbon is considered as a material within the meaning of the present invention, in combination with hydrogen, for example in the form of methane or of another hydrocarbon, the latter is capable of decomposing in the form of plasma, into carbon ions and hydrogen ions; the latter, after recombining, are capable of being removed in the form of hydrogen from the plasma enclosure. "Glass or vitreous substance" includes not only organic or inorganic glasses but also all the vitreous materials, whatever the localized order, as well as ceramics.

"Diamond-like amorphous carbon" is intended to mean a carbon without apparent crystalline structure, hydrogenated or otherwise, containing no localized order on a scale of one nanometer.

"Thin layer" is intended to mean a layer having a thickness of between 10 and 100 nanometers, virtually transparent and frequently invisible to the user.

Although the present invention is not limited to this application, the latter is now described with reference to the deposition of a layer of diamond-like amorphous carbon on a hollow glass article.

In order to improve the mechanical properties of a glass article, especially the impact strength and scratch resistance, and also in order to improve the corrosion resistance of the same article, it is known to place the said article in contact with a plasma of a hydrocarbon substance, in order to develop on its surface a thin layer of diamond-like amorphous carbon, endowing it with the required properties, especially by virtue of a compression of its surface layers.

A process of this kind has been described, for example, in patent GB-A-2,105,371, for glass optical fibers.

A paper by A. Bubenzer, B. Dischler, G. Brandt and P. Koidl in the "Journal of Applied Physics", No. 931 of Aug. 8, 1983, volume 54, pages 4590 to 4595, has detailed the conditions for producing a thin layer of this kind, especially the various parameters of the plasma affecting the density, the thickness and the diamond-like properties of the layer produced. Among these parameters there appear, in particular, the energy of the hydrocarbon ions, the cathode voltage, the gas pressure and the temperature of the substrate to be coated with the thin layer.

Furthermore, other ways of depositing amorphous carbon, by means of decomposition of a carbonaceous material in vacuum, have been proposed:
 reactive radio-frequency spraying (diode, coaxial, magnetron);
 ion spraying, especially by means of a gun;
 ion beams, that is to say ion spraying assisted by a second gun; and
 ion implantation.

The present invention specifically concerns the deposition of a thin layer of a material on a hollow body, especially a bottle. Its subject is a technique for depositing a thin layer of this kind on the outside and/or on the inside of a hollow body of this kind, and specifically adapted to the latter.

According to the invention, among the various deposition techniques listed above, it has been found that only the deposition of a material by means of plasma (by means of a d.c. or radio-frequency discharge) was suitable for the treatment of hollow bodies, especially within the framework of continuous industrial processes. More precisely, by arranging a cathode inside the hollow body and the other electrode outside the latter, it is possible to induce a negative charge on the two surfaces (internal and external) of the hollow body, by means of which the latter may be coated, in contact with a plasma, with a thin and uniform layer of the material.

Compared with other ways of depositing a thin layer, the solution as claimed in the invention has the following decisive advantages:
 (1) both the inside and the outside of the hollow body can be coated; and
 (2) since the wall itself of the hollow body is polarized in a uniform manner, a homogeneous thin layer is produced over the entire internal and/or external surface of the said body.

A preferred embodiment of the present invention consists in using a cathode whose apparent and effective volume matches and is proportioned to the internal volume of the hollow body, and in determining the distance between the internal surface of the said body and the apparent surface of the electrode, at a value not exceeding the thickness of the black space facing the cathode, under the conditions of the plasma employed.

According to the present invention, it should be understood that the cathode may be in contact with the wall of the hollow body.

"Black space" is intended to mean the region in the vicinity of the cathode, in which the plasma ions move from the plasma voltage to that of the cathode, and are consequently accelerated towards the cathode. The thickness of this space depends on the various parameters of application of the plasma, which are given in detail, for example, in the abovementioned paper by A. Bubenzer et al.

BRIEF DESCRIPTION OF THE DRAWING

The present invention is now described with reference to the attached drawings, in which:

FIG. 1 shows a cathodic device in accordance with the invention in an operating position inside a bottle, or hollow body.

DETAILED DESCRIPTION OF THE DRAWING

Figure 1A:
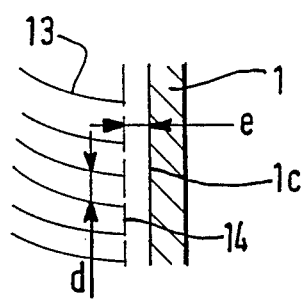
FIG. 1a is an enlarged view of a part of FIG. 1.

According to FIG. 1, there is shown diagrammatically hardware for depositing a thin layer of diamond-like amorphous carbon on the wall, that is to say on the outside and/or on the inside of the latter, of a glass bottle (1), which comprises a neck (1a) of narrow cross-section and a main part (1b) of wider cross-section.

This hardware comprises, generally:

a cylindrical metal enclosure (2), comprising a lid (3); this enclosure is connected electrically to ground;

a vacuum pump (4) enabling the enclosure (2) to be evacuated and making it possible to pump selectively the hydrogen resulting from the decomposition of the plasma present and operating in the said enclosure;

a valve (5) permitting the introduction into the enclosure (3), optionally by means of an appropriate volume dispensing system, of a calibrated and adjustable flow of methane, outside the bottle (1);

a stopcock (6) making it possible to introduce, by means of the cathodic device described hereinafter, a calibrated and adjustable flow of methane into the interior of the enclosure (2), and also into the interior of the bottle (1);

an electric generator (7) connected to the cathodic device by means of a variable capacity (8), enabling a plasma to be generated within the enclosure (2), by means of direct or radio-frequency current; and the cathodic device (9) proper, electrically insulated from the enclosure (2) by a ring (10) of insulating material.

The cathodic device (9) comprises a metal base (11), an axial metal core (12), and a large number of metal wires (13) arranged around and in electrical contact with the core (12), over the entire length of the latter. Means which are not shown enable the wires (13) to be retracted from the wide cross-section extended form shown in FIG. 1, into the narrow cross-section, gathered form shown in FIG. 2. This variable geometry of the cathode enables the latter to be introduced and withdrawn, in the gathered form, from the bottle (1) through its neck (1a).

According to FIG. 1a, during operation, and in the extended form shown in FIG. 1, the distance d separating the free ends of the metal wires (13) is of the same order of magnitude as the thickness e of the black space facing the cathode under the plasma conditions employed. In this way, the surface surrounding and including the free ends of the wires (13) behaves like a bulk cathode matching and proportioned to the internal volume of the bottle (1), the distance between the inner surface (1c) of the latter and the apparent surface (14) of the cathode being equal to the thickness e of the black space facing the said cathode, under the plasma conditions employed (compare FIG. 1a).

As shown in FIG. 1, the base (11) of the cathode (9) includes a conduit for distributing, via perforations (12a) in the central core (12), methane introduced into the enclosure (2) and, more precisely, into the bottle (1).

By closing or opening the stopcocks (5) and (6), and in particular by stoppering the neck (1a) of the bottle (1) with the base (11) of the cathode (9), methane can be introduced at will inside and/or outside the bottle (1).

Figure 3:
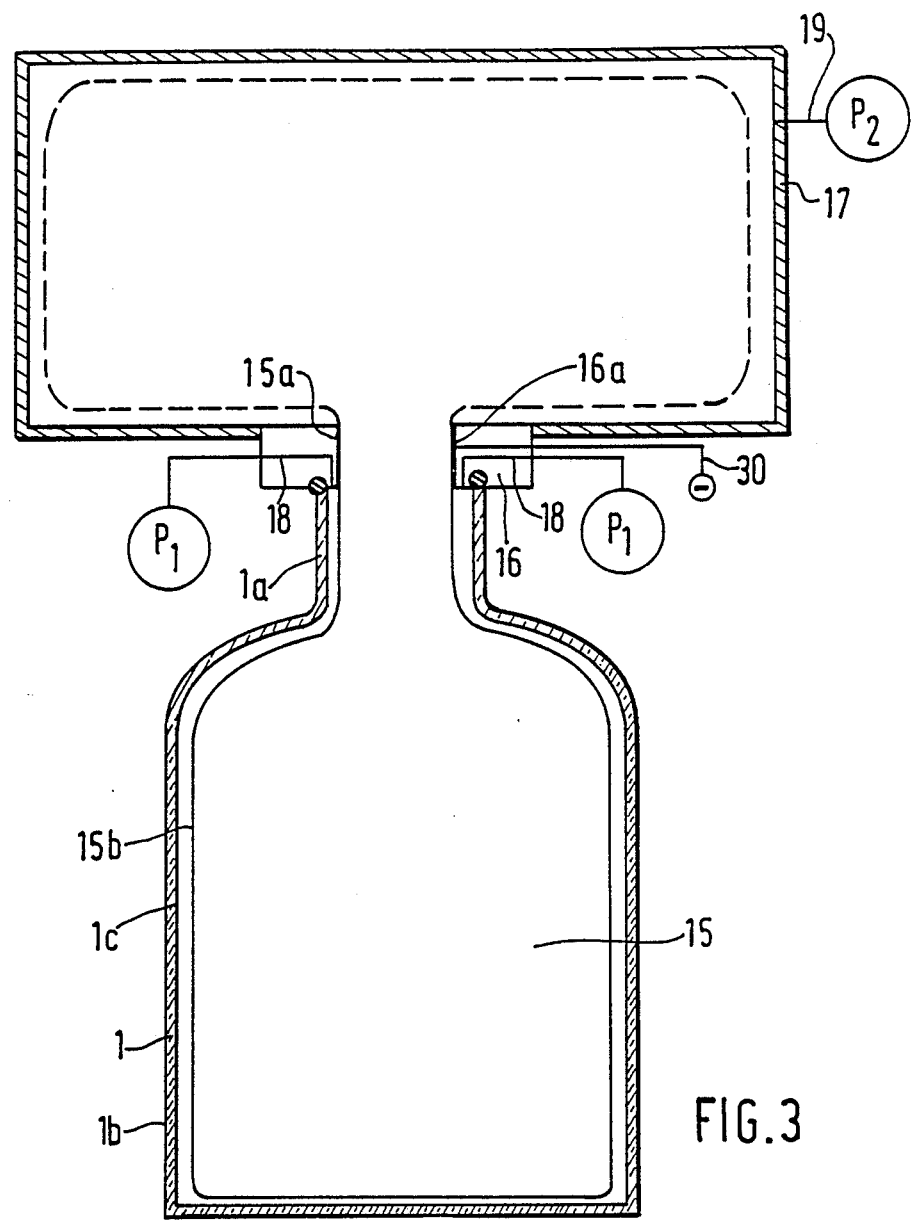
FIG. 3 shows another cathodic device according to the invention.

Another cathodic device according to the invention, shown in FIG. 3, comprises:

a bag-shaped envelope (15) and proportioned to the bottle to be treated, made of supple and leakproof material, for example a plastic material, and metallized on at least one side, namely on the outside of the form shown using solid lines in FIG. 1;

a plug (16) made of an electrically insulating material, capable of stoppering the neck (1a) of the bottle (1), comprising an axial opening (16a) onto which the neck (15a) of the bag (15) is integrally fastened in a leakproof manner, the outside and metallized face of this neck being connected to a cathode 30;

a metal enclosure (17) fastened in a leakproof manner onto the stopper (16), outside the bottle (1); and channels (18) provided inside the plug (16), making it possible to place a source of gass under the pressure P1 in communication with the space situated inside the bottle (1), between the inner face (1c) of the latter and the metallized outer face (15b) of the envelope (15). Furthermore, a conduit (19) enables the interior of the box (17), and hence of the bag (15), to be placed in communication with a source of gas at the pressure P2.

By controlling the pressure difference between the sources P1 and P2 it is possible to insert the envelope (15) into the bottle (1), according to the form shown using solid lines in FIG. 3, and to withdraw the same envelope (15) in a reversed position, from the bottle (1), according to the position shown using broken lines, inside the box (17), according to FIG. 3.

The cathodic operating position corresponds to that shown using solid lines in FIG. 3 and, as before, the distance between the inner surface (1c) of the bottle and the outer surface (15b) of the envelope is chosen with a value not exceeding the thickness of the black space facing the cathode (namely the metallized bag (15)), under the plasma conditions employed.

Figure 2:
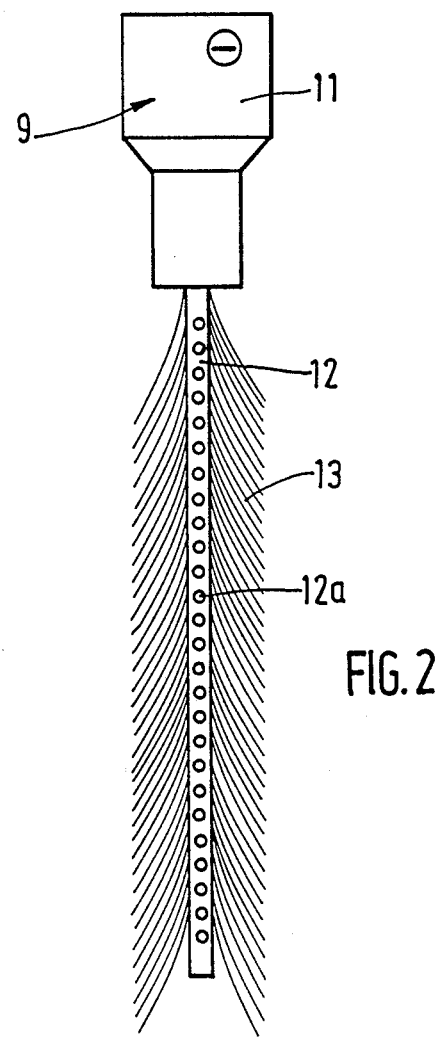
FIG. 2 shows the same device, in a retracted position, so that it may be withdrawn through the neck of the bottle.

The hardware in accordance with FIG. 1 is used in the following manner:

(a) the bottle (1) is arranged inside the enclosure (2), (b) the wires (13) of the cathode (9) are retracted according to the position shown in FIG. 2, and the cathode is introduced into the bottle (1) through the neck (1a), (c) the wires (13) are deployed according to the position shown in FIG. 1, (d) the enclosure (2) is closed with the lid (3), the cathode being fitted in a leakproof manner and insulated electrically in relation to the lid, (e) the enclosure (4) is evacuated and then methane is introduced through the valves (5) and/or (6), (f) by virtue of the generator (7), a plasma of the gas introduced into the enclosure (2) is produced, and this gives rise to a deposit of diamond-like amorphous carbon on the outer face and/or the inner face of the wall of the bottle (1), and (g) when the treatment is finished, the above operations are repeated in reverse order, in order to withdraw the treated bottle from the enclosure (2).

On an industrial scale, the process described above may be carried out continuously on the glass bottle production line, the deposition of amorphous carbon being performed, for example, sequentially, in a vacuum chamber.

In practice, the preferred operating conditions are as follows:

the energy of the carbon species deposited should have an impact energy of at least five hundred electron-volts; it has been found that when this energy was less than this threshold of five hundred electron-volts the deposited layer was not hard enough; on the other hand, when this energy exceeded twenty thousand electron-volts, a layer was no longer produced, but an actual carbon implantation took place; and the rate of deposition should be at least 30 nanometers per minute; in fact, when this rate was less than this threshold, the process was less effective, because the hardness is proportional to the rate of deposition; as will be appreciated, it is preferable that the rate be as high as possible.

Using a device according to FIG. 1, a real physical quenching is produced, with axial compression stresses of the order of $10^8$ pascals being developed at the surface of the treated bottles.

More precisely, when:

the cathode (9) is polarized at 700 V d.c., a pressure of $9\ 10^{-2}$ millibars is maintained in the enclosure (2), and a methane flow of 25 cm$^3$/min, under the normal conditions of pressure and temperature, is introduced into the enclosure (2) through the valve (5), then, on the outside of the bottle (1), there is produced a 30-nanometer layer of diamond-like amorphous carbon with a Knoop hardness of 4,000 kq/mm$^2$, under a 30 g load applied for 30 seconds.

I claim:

1. A process of depositing a material on at least a surface of a container, said container having an inner surface defining an internal volume of said container and an outer surface, said process comprising:

providing a cathode within said container spaced adjacent an inner surface of said container, wherein said cathode has a variable apparent and effective volume, such that said cathode can be inserted into said container and then radially extended so as to substantially fill said internal volume of the container;

providing an electrode spaced adjacent with an outer surface of said container;

providing a closure lid for said container, wherein said cathode is arranged in an air tight manner in said closure lid and electrically insulated therefrom;

evacuating said container;

providing an adjusted flow of a gaseous complex into said evacuated container, said gaseous complex comprising a source of the material which is to be deposited;

polarizing said cathode, wherein said polarizing step causes the formation of a plasma of said gaseous complex, from which plasma said material is deposited onto a surface of said container; and removing any undeposited remaining constituents of said gaseous complex from said container by evacuating said remaining constituents from said container.

2. A process according to claim 1, wherein said cathode is spaced a predetermined distance away from said inner surface, said distance being equal to a value which does not exceed a black space thickness value of said plasma, wherein said black space thickness value is variably dependent on the plasma forming conditions.

3. A process according to claim 1, wherein said cathode further comprises an apparent and effective volume which is proportional in size and shape to said internal volume.

4. A process according to claim 1, wherein said cathode, when in its radially extended mode, is spaced a predetermined distance away from said inner surface, said distance being equal to a value which does not exceed a black space thickness value of said plasma, wherein said black space thickness value is variably dependent on the plasma forming conditions.

5. A process according to claim 1, wherein said cathode further comprises a variable apparent and effective volume such that said cathode can be radially retracted within said container and then removed from said container.

6. A process according to claim 1, wherein said cathode comprises a metal base, an axial metal core, and a plurality of metal wires, wherein said wires are arranged around said core over the entire length thereof and said wires are in electrical contact with said core.

7. A process according to claim 1, wherein said cathode comprises a bag shaped envelope, wherein said envelope is made of a supple material and said envelope is metallized on at least one surface thereof.

8. A process according to claim 7, wherein said cathode, when in its radially extended mode, is spaced a predetermined distance away from said inner surface, said distance being equal to a value which does not exceed a black space thickness value of said plasma, wherein said black space thickness value is variably dependent on the plasma forming conditions.

9. A process according to claim 1, wherein said gaseous complex comprises a hydrocarbon.

10. A process according to claim 9, wherein said hydrocarbon is methane and said deposited material is amorphous carbon.

11. A process according to claim 1, wherein said plasma is formed by the ionization of said gaseous complex and an energy for said ionization is supplied by an energy source located externally of said container.

12. A process according to claim 11, further comprising an energy of a species of said deposited material, wherein said energy is between 500-20,000 eV.

13. A process according to claim 1, further comprising a rate of deposition of said deposition material, wherein said rate is not less than 30 nm/min.

14. A process of depositing a material on at least one surface of a container, said container having an inner surface defining an internal volume of said container and an outer surface, said process comprising:

arranging said container in an enclosure;

providing a cathode within said container spaced adjacent an inner surface of said container, wherein said cathode has a variable apparent and effective volume, such that said cathode can be inserted into said container and then radially extended so as to substantially fill the internal volume of the container;

providing an electrode spaced adjacent with an outer surface of said container;

providing a closure lid for said enclosure, wherein said cathode is arranged in an air tight manner in said closure lid and electrically insulated therefrom;

evacuating said enclosure;

providing an adjusted flow of a gaseous complex into said evacuated enclosure, said gaseous complex comprising a source of the material which is to be deposited;

polarizing said cathode, wherein said polarizing step causes the formation of a plasma of said gaseous complex, from which plasma said material is deposited onto a surface of said container; and removing an undeposited remaining constituent of said gaseous complex from said container by evacuating said remaining constituent from said container.

15. A process according to claim 14, wherein said cathode is spaced a predetermined distance away from said inner surface, said distance being equal to a value which does not exceed a black space thickness value of said plasma, wherein said black space thickness value is variably dependent on the plasma forming conditions.

16. A process according to claim 14, wherein said cathode further comprises an apparent and effective volume which is proportional in size and shape to said internal volume.

17. A process according to claim 14, wherein said cathode, when in its radially extended mode, is spaced a predetermined distance away from said inner surface, said distance being equal to a value which does not exceed a black space thickness value of said plasma, wherein said black space thickness value is variably dependent on the plasma forming conditions.

18. A process according to claim 14, wherein said cathode further comprises a variable apparent and effective volume such that said cathode can be radially retracted within said container and then removed from said container.

19. A process according to claim 14, wherein said cathode comprises a metal base, an axial metal core, and a plurality of metal wires, wherein said wires are arranged around said core over the entire length thereof and said wires are in electrical contact with said core.

20. A process according to claim 14, wherein said cathode comprises a bag shaped envelope, wherein said envelope is made of a supple material and said envelope is metallized on at least one surface thereof.

21. A process according to claim 20, wherein said cathode, when in its radially extended mode, is spaced a predetermined distance away from said inner surface, said distance being equal to a value which does not exceed a black space thickness value of said plasma, wherein said black space thicknes value is variably dependent on the plasma forming conditions.

22. A process according to claim 14, wherein said gaseous complex comprises a hydrocarbon.

23. A process according to claim 22, wherein said hydrocarbon is methane and said deposited material is amorphous carbon.

24. A process according to claim 14, wherein said plasma is formed by the ionization of said gaseous complex and an energy for said ionization is supplied by an energy source located externally of said enclosure.

25. A process according to claim 24, further comprising an energy of a species of said deposited material, wherein said energy is between 500–20,000 eV.

26. A process according to claim 14, further comprising a rate of deposition of said deposited material, wherein said rate is not less than 30 nm/min.

* * * * *